United States Patent [19]

Bair et al.

[11] Patent Number: 5,078,510
[45] Date of Patent: Jan. 7, 1992

[54] BEARING ISOLATOR

[75] Inventors: John J. Bair, Union Lake, Mich.;
Edward J. Bantz, Grafton, Wis.;
Gerald D. Damon, Farmington,
Mich.

[73] Assignee: Eaton Corporation, Cleveland, Ohio

[21] Appl. No.: 572,295

[22] Filed: Aug. 27, 1990

[51] Int. Cl.⁵ .............................................. F16C 27/06
[52] U.S. Cl. ..................................... 384/536; 384/582
[58] Field of Search ................ 384/536, 535, 582, 581

[56] References Cited
U.S. PATENT DOCUMENTS

| | | | |
|---|---|---|---|
| 2,362,938 | 11/1944 | Short | 384/536 |
| 3,050,352 | 8/1962 | Moxley | 308/184 |
| 3,385,543 | 5/1968 | Jäkel | 248/26 |
| 3,447,846 | 6/1969 | Marsh | 308/184 |
| 3,704,922 | 12/1972 | Kleinschmidt et al. | 308/26 |
| 3,743,365 | 7/1973 | Kato | 308/26 |
| 3,885,840 | 5/1975 | Neder | 308/184 |
| 4,229,055 | 10/1980 | Olschewski et al. | 308/26 |

Primary Examiner—Thomas R. Hannon
Attorney, Agent, or Firm—R. A. Johnston

[57] ABSTRACT

A two-piece bearing isolator assembly for mounting roller or ball bearing races to a mounting structure for journalling a shaft. An outer Z-shaped metallic ring has outwardly and inwardly extending flanges on opposite axial margins. The outward flange retains the ring axially in a mounting structure; whereas, the inner flange retains plastic energy absorbing pads receiving the outer race, in line-to-line contact, of a bearing to be mounted. In one embodiment separate pads are disposed in circumferentially spaced apertures in the metallic ring. In another embodiment, separate pads are spaced circumferentially about an integrally formed plastic ring received in the metallic ring. The inner flange also serves as a stop for limiting radial movement of the bearing with respect to the mounting structure.

1 Claim, 1 Drawing Sheet

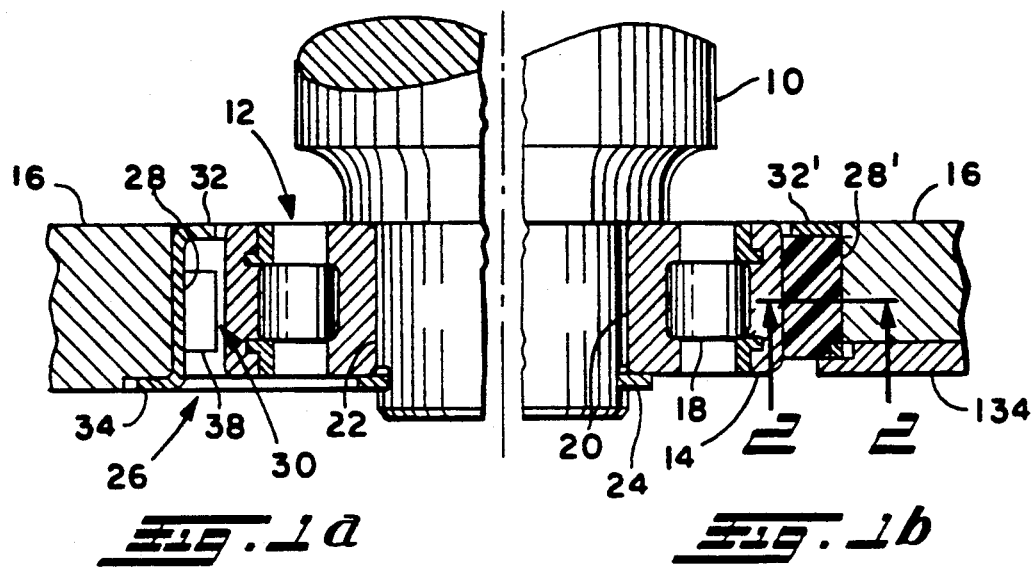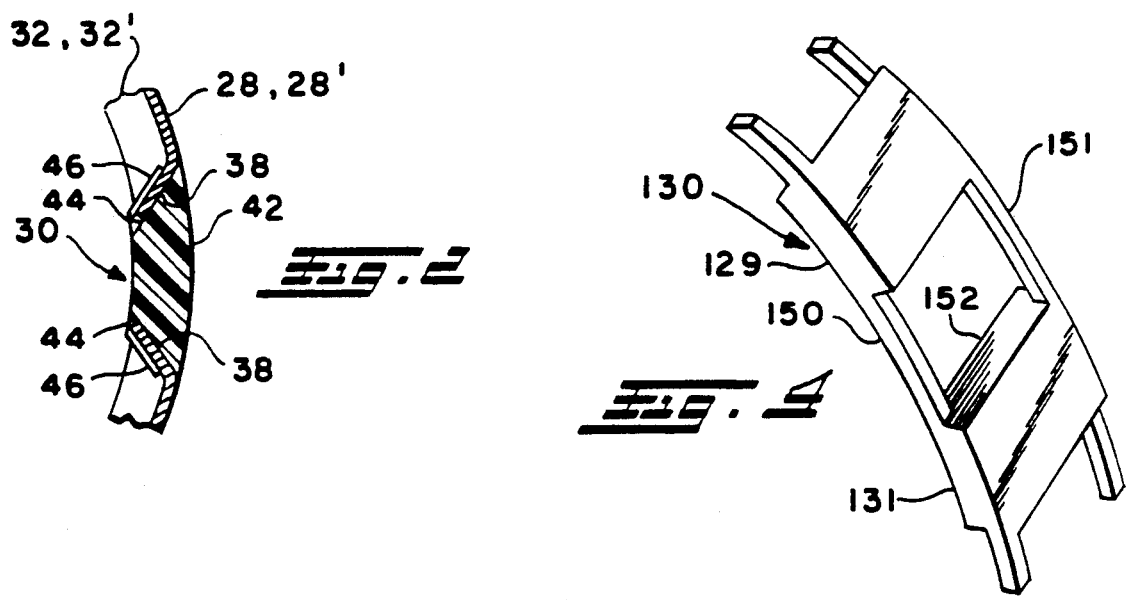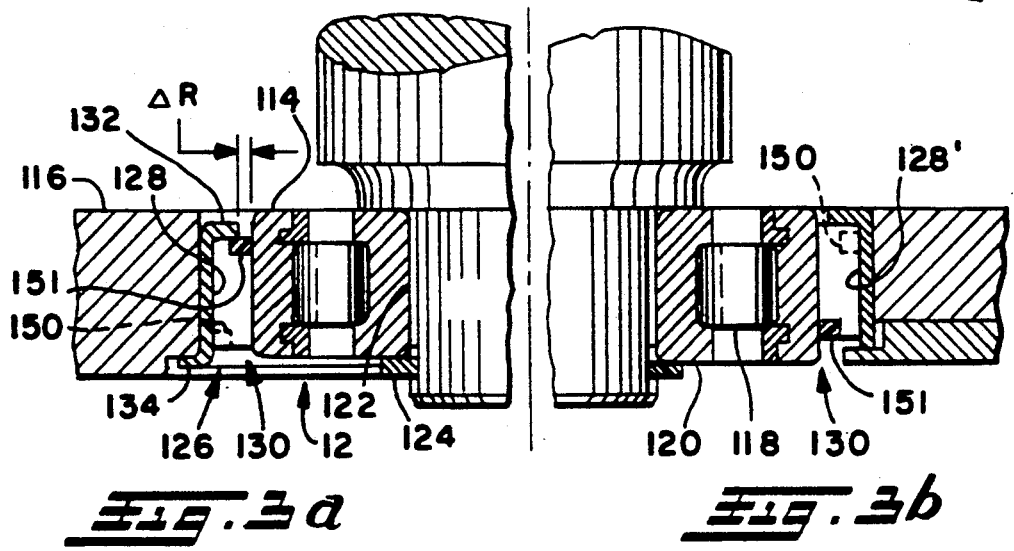

BEARING ISOLATOR

BACKGROUND OF THE INVENTION

The present invention relates to the installation of bearings in housings or casings for power transmission shafts and particularly to ball and roller bearings employed in transmissions for the vehicular drive trains. In heavy duty on-and-off highway vehicles where substantial torque is transmitted through Power transmissions as for example, gearboxes, problems have been encountered in providing quiet operation, and, it has been desired to reduce the gear noise transmitted from gear shafts through the journals to the housing or gear casing.

In typical heavy duty power transmissions employed for vehicular use, the bearings employed for journalling the various shafts in the transmission have the outer race of the bearing registered directly against the gear casing which is commonly formed of metal such as cast iron, steel or aluminum. Thus, vibrations brought about by the high torque meshing of gear teeth are transmitted from the shafts and the bearing races to the casing or housing providing, in some cases, resonance of the housing and an amplification of the noise.

In order to provide for quieter operation of heavy duty power transmissions employing gears, it has thus been desired to find a way or means of isolating the bearing journals from the gear casing or housing to provide dampening of the gear noise and prevent transmission of the gear noise or vibration to the housing.

SUMMARY OF THE INVENTION

The present invention provides a unique and novel isolator for bearings, and particularly ball and roller bearings. The invention particularly relates to such bearings as are employed for journalling power transmission shafts in a rigid housing such as the journalling of shafts onto the housing or casing of a heavy duty vehicle gearbox. The bearing isolator of the present invention provides for dampening of gear noise transmitted through the shaft and comprises energy absorbing pad means which may comprise separate pads or pad portions spaced circumferentially about an integrally formed annular member received over the outer race of the bearing. An outer annular metallic member is employed for mounting on the housing. Energy absorbing means comprising pad portions thereof are in interference contact with the outer bearing race. The energy absorbing portions or pads in direct contact with the outer surface of the outer bearing race are resiliently deflected and absorb vibration and movement of the shaft by radial compression. The outer annular metallic member has radially outwardly extending flange means provided with an axial face for registration against the casing or housing means to maintain the isolator in the desired axial position. Radially inwardly extending flange means are formed on the metallic member for retaining the pad means.

It is an object of the present invention to provide a plastic bearing isolator having energy absorbing means defining a circumference of a preselected diameter for providing desired attenuation of radial movement of a bearing disposed therein.

It is another object of the present invention to provide a bearing isolator having a one-piece integrally formed compressible energy absorbing pad means for dampening radial movement of the bearing and an annular metallic member for retaining the energy absorbing pad means in the desired position in the bearing mounting structure.

It is an additional object of the present invention to provide a unique and novel plastic bearing isolator having integral portions thereof with predetermined compressibility comprising a Plurality of pads to absorb radial movement of the outer bearing race with respect to the casing or housing which isolator is mounted on a bearing mounting structure by a metallic retaining ring.

BRIEF DESCRIPTION OF THE DRAWINGS

FIG. 1a is a half-sectional view of a roller bearing mounted for journalling a shaft employing the isolator of the present invention embodying separate non-metallic energy absorbing members;

FIG. 1b is a view similar to FIG. 1a, and showing an alternate embodiment of the retaining flange means;

FIG. 2 is a portion of a section view, taken along section indicating lines 2—2 of FIG. 1b;

FIG. 3a is a view similar to FIG. 1a of a bearing journalling a shaft in a mounting structure and employing an alternate embodiment of the present invention;

FIG. 3b is a view similar to FIG. 3a, illustrating an alternate embodiment of the retaining flange means; and, FIG. 4 is a somewhat exonometric view of a potion of the bearing isolator of FIGS. 3a and 3b.

DETAILED DESCRIPTION

Referring to FIG. 1a and 1b, a shaft 10 is illustrated as journalled in a bearing assembly indicated generally at 12 having an outer race 14 which is mounted in a suitable mounting structure 16 as for example, the wall of a gear casing or gear box. The bearing assembly 12 has, in addition to the outer race 14, a plurality of rollers 18 disposed circumferentially thereabout and intermediate the outer race 14 and an inner race 20. The inner race is retained on a surface 22 provided on shaft 10 by a suitable means such as the retaining ring 24. The outer race 14 of the bearing is registered in a bearing isolator assembly indicated generally at 26 which comprises an outer annular cage member 28 formed of metallic material and an energy absorbing pad means indicated generally at 30. Referring to FIG. 1a, the cage member 28 is shown in the preferred form as having a generally Z-shaped configuration with radially inwardly extending flange means 32 provided at one axial margin thereof. Flange means 32 provides a motion-limiting stop, or bump stop, for limiting movement in the radial direction. A radially outwardly extending flange means 34 provided at the opposite axial margin of member 28 for axially registering against the mounting structure 16.

Referring to FIG. 1b, an alternate version of the cage member is denoted by reference numeral 28' and has a radially inwardly extending flange means 32' or bump stop provided on one axial margin thereof; and, the opposite axial margin thereof is retained on the mounting structure by a separate retaining member 134 attached to the mounting structure.

In the present practice of the invention for application in a heavy duty vehicle transmission, the embodiment of FIG. 1a would be used on one end, such as the forward end, of a gear shaft; whereas, the embodiment of FIG. 1b would be used on the opposite end, such as the rear end, of the same shaft to facilitate assembly of the transmission.

Referring to FIG. 2, the bearing isolator 30 is shown in greater detail as having the annular cage member 28,28' provided with a plurality of apertures, one of which is shown in FIG. 2, with the opposite margins thereof shown with portions 38 directed radially inwardly preferably obliquely. The pad means 30 is illustrated in FIG. 2 as comprising a plurality of separate plastic pads 42 each received in one of the apertures with the margins of the pad 42 engaging the radially inwardly extending portions 38 of the cage member 28,28'. In the presently preferred practice, the pad members 42 are formed of a suitable plastic material such as polyamide-imide material. The inner circumferential surface of each of the pads 42 is sized and configured to interfit in at least line-to-line engagement with the outer periphery of the bearing race 14 to be mounted on the structure 16. This line-to-line engagement prevents any radial movement of the bearing race 14 with respect to the inner surface of the pad means 30.

Referring to FIG. 2, the individual pads 42 each have a recess 44 formed in the opposite circumferential margins thereof with the recesses thereby forming lugs 46 extending in the circumferential direction from opposite axial ends of the pad 42. The lugs 46 are engaged about the axial ends of the radially inwardly 35 extending portions 38 of the cage member 28,28' for retaining the pads 42 on the cage member.

Referring to FIGS. 3a and 3b, another embodiment of the bearing isolator indicated generally at 126 is shown as installed on mounting structure 116. Isolator 126 has a bearing assembly 112 received therein having an outer race 114 with a plurality of circumferentially spaced rollers 118 disposed thereabout with an inner race 120 received over a shaft 122 and retained thereon by suitable retaining means 124 which may comprise a snap ring.

Referring to FIG. 3a isolator assembly 126 includes an annular cage member 128 formed of metallic material which has in the preferred practice a generally Z-shaped configuration cross section with a radially outwardly extending flange means 134 provided on one axial margin thereof and a radially inwardly extending flange means 132 provided on the opposite axial margin thereof. The flange means 132 functions as a bump stop to limit movement in a radial direction. An energy absorbing pad means, indicated generally at 130, is disposed about the inner periphery of the cage member 128 and has the outer periphery of the outer bearing race 114 registered thereagainst in at least line-to-line contact about the circumference thereof. Referring to FIG. 3b, the alternate cage 128' has only a radially inwardly-extending flange 134'.

Referring to FIG. 4, the pad means 130 of the FIGS. 3a and 3b embodiment is illustrated as comprising a unitary annular member having a plurality of circumferentially spaced pad portions 129,131 disposed thereabout in circumferentially spaced relationship. The pads 129,131 are interconnected circumferentially by rail portions 150,151 provided on opposite axial margins of the pads 129,131, thereby providing circumferentially spaced cut-outs or apertures such as cut-out 152. The unitary pad means 130 of FIG. 4, thus is received axially in the cage member 128, 128'; and, if desired, portions of the cage member 128, 128' may be provided extend radially intermediate the pad portions 129,131 to prevent relative rotation of the pad means 130 in the cage member 128, 128' similar to the portions 38 in the embodiment of FIGS. 1a, 1b, and 2.

Although the invention has been described and illustrated with respect to mounting straight roller bearings, it will be understood that the invention is equally applicable to tapered roller and ball bearings.

It will be understood that the inner flange means 32,32' and 132 extend radially inwardly an amount, denoted $\Delta R$ in FIG. 3a, less than the inner periphery of the pad means 30,130. The distance $\Delta R$ is chosen to limit the radial movement of the bearing 112 with respect to the housing 116.

The present invention thus provides a unique and novel bearing isolator having an outer metal ring with resilient energy absorbing pad means provided about the inner periphery thereof for absorbing resiliently any radial movement of the outer periphery of the race of a bearing to be mounted. In one embodiment, the pad means comprises a plurality of individual pads disposed about the inner periphery of the metal cage member. In another embodiment, the pad means comprises an annular unitary member formed of non-metallic material having pad portions circumferentially spaced thereabout and disposed within the inner periphery of the cage member. The pad means of the isolator of the present invention are preferably formed of a suitable plastic material to provide the energy absorbing resilience to dampen vibrational movement of the outer bearing race.

Although the invention has been described hereinabove with respect to the illustrated embodiments, it will be understood that other embodiments are contemplated in the invention as capable of modification and variation and is limited only by the following claims.

We claim:

1. An isolator assembly for a bearing journalling a shaft on a mounting structure comprising:
   (a) a unitary annular cage member having first flange means formed at one axial margin thereof, said first flange means extending radially outwardly therefrom and adapted for registration axially against said mounting structure, said cage member having second flange means extending radially inwardly adapted for limiting movement of a bearing race;
   (b) pad means formed of non-metallic material defining a plurality of circumferentially spaced energy absorbing pad surfaces formed by a plurality of circumferentially spaced cut-outs disposed about the inner periphery of said cage members, said pad surfaces defining an inner periphery of a bearing race to the outer periphery of a bearing to be mounted on said mounting structure, and said cage member has the outer periphery thereof adapted for closely interfitting with said mounting structure.

* * * * *

UNITED STATES PATENT AND TRADEMARK OFFICE
CERTIFICATE OF CORRECTION

PATENT NO. : 5,078,510

DATED : January 7, 1992

INVENTOR(S) : J. J. Bair, et al.

It is certified that error appears in the above-identified patent and that said Letters Patent is hereby corrected as shown below:

Column 4, Line 54: "members" should read --member--

Signed and Sealed this

Thirteenth Day of July, 1993

Attest:

MICHAEL K. KIRK

*Attesting Officer*  *Acting Commissioner of Patents and Trademarks*